US012626314B2

(12) United States Patent
Imai

(10) Patent No.: US 12,626,314 B2
(45) Date of Patent: May 12, 2026

(54) ELECTRONIC TICKET INFORMATION PROCESSING APPARATUS, ELECTRONIC TICKET INFORMATION PROCESSING SYSTEM, ELECTRONIC TICKET INFORMATION PROCESSING PROGRAM, AND ELECTRONIC TICKET INFORMATION PROCESSING METHOD

(71) Applicant: Gigi Inc., Fukuoka (JP)

(72) Inventor: Ryosuke Imai, Tokyo (JP)

(73) Assignee: Gigi Inc., Fukuoka (JP)

( * ) Notice: Subject to any disclaimer, the term of this patent is extended or adjusted under 35 U.S.C. 154(b) by 23 days.

(21) Appl. No.: 18/972,807

(22) Filed: Dec. 6, 2024

(65) Prior Publication Data

US 2025/0104167 A1    Mar. 27, 2025

Related U.S. Application Data

(63) Continuation of application No. 18/854,961, filed as application No. PCT/JP2023/030539 on Aug. 24, 2023, now abandoned.

(30) Foreign Application Priority Data

Dec. 20, 2022    (JP) ................................. 2022-202906

(51) Int. Cl.
    *G06Q 50/12*      (2012.01)
    *G06Q 20/04*      (2012.01)
    *G06Q 30/0601*     (2023.01)

(52) U.S. Cl.
    CPC ......... *G06Q 50/12* (2013.01); *G06Q 20/0457* (2013.01); *G06Q 30/0641* (2013.01)

(58) Field of Classification Search
    CPC ............... G06Q 50/12; G06Q 20/0457; G06Q 30/0641
    See application file for complete search history.

(56) References Cited

U.S. PATENT DOCUMENTS

2022/0148000 A1*   5/2022   Mimassi ................ G16H 20/60

FOREIGN PATENT DOCUMENTS

| | | | |
|---|---|---|---|
| JP | H07-068984 A | | 3/1995 |
| JP | 2017117258 A | * | 6/2017 |
| JP | 2020013322 A | * | 1/2020 |

OTHER PUBLICATIONS

International Search Report issued in PCT/JP2023/030539; mailed Nov. 14, 2023.

(Continued)

*Primary Examiner* — Ariel J Yu
*Assistant Examiner* — Denisse Y Ortiz Roman
(74) *Attorney, Agent, or Firm* — Studebaker Brackett PLLC

(57) ABSTRACT

To provide an electronic ticket information processing apparatus for providing a user with an electronic ticket available in a store without imposing a burden on the store side.

An electronic ticket information processing apparatus includes: a storage unit that stores user identification information, and an available amount and an available period of an electronic ticket to be provided to a user in association with the user identification information; an acquisition unit that acquires transaction information from an image obtained by photographing a receipt issued when the user performs a purchase transaction at a target store; an extraction unit that extracts, based on the acquired transaction information, use amount information indicating an amount to be a use target of the electronic ticket; a calculation unit that calculates an accumulated use amount of the electronic ticket by the user in the available period by accumulating amounts indicated by the use amount information for respective pieces of transaction information in which a transaction date is included in the available period; and an output unit (Continued)

that outputs an amount according to the accumulated use amount as an amount to be paid to the user.

7 Claims, 13 Drawing Sheets

(56)                 References Cited

OTHER PUBLICATIONS

International Preliminary Report on Patentability (Chapter II) issued in PCT/JP2023/030539; completed Mar. 29, 2024.
An Office Action; mailed by the Canadian Intellectual Property Office on Jun. 23, 2025, which corresponds to Canadian Patent Application No. 3,256,116 and is related to U.S. Appl. No. 18/972,807; with English language translation.
An Office Action; mailed by the Canadian Intellectual Property Office on Feb. 2, 2026, which corresponds to Canadian Patent Application No. 3,256, 116 and is related to U.S. Appl. No. 18/972,807.

* cited by examiner

FIG. 8

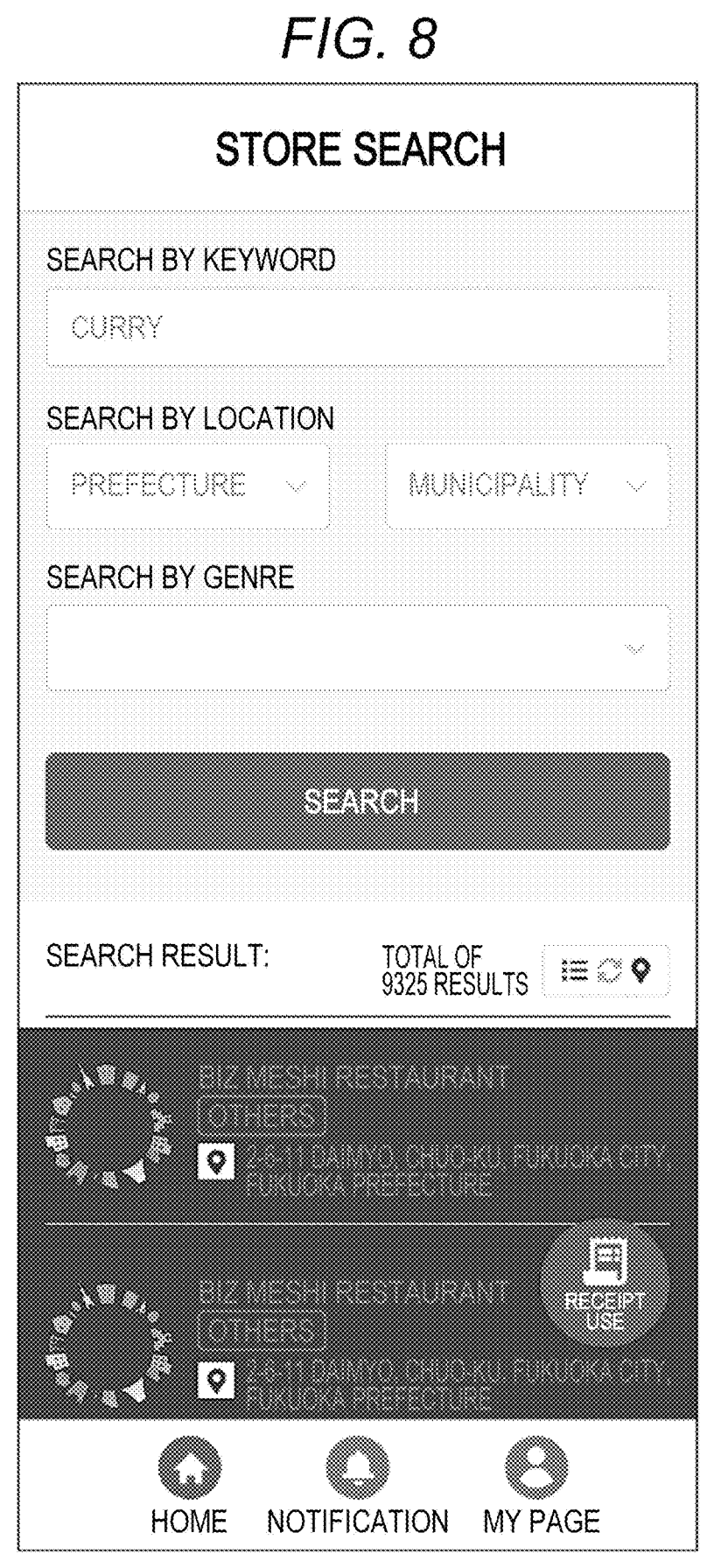

STORE SEARCH

SEARCH BY KEYWORD

CURRY

SEARCH BY LOCATION

PREFECTURE ⌄    MUNICIPALITY ⌄

SEARCH BY GENRE

⌄

SEARCH

SEARCH RESULT:      TOTAL OF 9325 RESULTS   ☰ ⟳ ◉

BIZ MESHI RESTAURANT
OTHERS
◉

BIZ MESHI RESTAURANT
OTHERS
◉
RECEIPT USE

HOME    NOTIFICATION    MY PAGE

FIG. 15

ELECTRONIC TICKET INFORMATION PROCESSING APPARATUS, ELECTRONIC TICKET INFORMATION PROCESSING SYSTEM, ELECTRONIC TICKET INFORMATION PROCESSING PROGRAM, AND ELECTRONIC TICKET INFORMATION PROCESSING METHOD

CROSS-REFERENCE TO RELATED APPLICATIONS

This application is a Continuation of U.S. patent application Ser. No. 18/854,961 filed Oct. 7, 2024, which is the U.S. National Stage of International Application No. PCT/JP2023/030539 filed Aug. 24, 2023, which claims benefit of priority to Japanese Patent Application No. 2022-202906 filed Dec. 20, 2022, the entire contents of which are incorporated herein by reference.

TECHNICAL FIELD

The present invention relates to an electronic ticket information processing apparatus, an electronic ticket information processing system, an electronic ticket information processing program, and an electronic ticket information processing method.

BACKGROUND ART

Conventionally, in an organization such as a company in which a restaurant for employees is provided, cards and the like available in the restaurant are distributed (see Patent Literature 1 and the like).

CITATION LIST

Patent Literature

Patent Literature 1: JP 7-68984 A

SUMMARY OF INVENTION

Technical Problem

In recent years, a decrease in sales of restaurants due to the spread of the novel coronavirus has become a social problem. In relation to such a problem, the inventors of the present application propose various methods for allowing employees to use a normal restaurant like the restaurant for the employees, thereby contributing to the recovery of the sales of the restaurant. For example, a method is conceivable in which an electronic ticket available in the restaurant is issued to an employee, and the electronic ticket is available when the employee uses the restaurant.

However, in the method described above, it is necessary to construct a system and an operation for causing the electronic ticket to be available on the store side such as the restaurant, and a high burden on the store side becomes a major factor that hinders introduction and spread.

The present invention has been made in view of the above circumstances, and an object of the present invention is to provide an electronic ticket information processing apparatus, an electronic ticket information processing system, an electronic ticket information processing program, and an electronic ticket information processing method for providing a user with an electronic ticket available in a store without imposing a burden on the store side.

Solution to Problem

The above object is achieved by the following means.

(1) An electronic ticket information processing apparatus including: a storage unit that stores user identification information for identifying a user, and an available amount and an available period of an electronic ticket to be provided to the user in association with the user identification information; an acquisition unit that acquires, from an image obtained by photographing a receipt issued when the user who uses the electronic ticket performs a purchase transaction for receiving provision of a product or a service at a target store, transaction information including date and time information regarding a date and time when the purchase transaction is performed, store identification information for identifying a store where the purchase transaction is performed, transaction statement information indicating a statement of a purchase content in the purchase transaction, and amount information regarding an amount of the purchase transaction; an extraction unit that extracts, based on the transaction information acquired by the acquisition unit, use amount information indicating an amount to be a use target of the electronic ticket among amounts indicated in the amount information; a calculation unit that calculates an accumulated use amount of the electronic ticket by the user in the available period by accumulating amounts indicated by the use amount information for the transaction information in which a date and time indicated by the date and time information is included in the available period among respective pieces of transaction information sequentially acquired by the acquisition unit; and an output unit that outputs an amount according to the accumulated use amount calculated by the calculation unit as an amount to be paid to the user.

(2) The electronic ticket information processing apparatus according to the above (1), further including: a determination unit that determines whether or not the accumulated use amount of the electronic ticket in the available period calculated by the calculation unit exceeds the available amount of the electronic ticket in the available period, wherein when it is determined by the determination unit that the accumulated use amount exceeds the available amount, the output unit outputs the available amount as an amount to be paid to the user instead of the accumulated use amount.

(3) The electronic ticket information processing apparatus according to the above (1) or (2), further including: a provision unit that provides the electronic ticket to the user by setting the available amount and the available period for each predetermined period.

(4) The electronic ticket information processing apparatus according to the above (1) or (2), wherein the acquisition unit acquires information regarding a statement amount corresponding to each item of the statement indicated by the transaction statement information as the amount information, the electronic ticket information processing apparatus further includes an exclusion instruction reception unit that receives, from the user, an instruction as to whether or not each item of the statement indicated by the transaction statement information is excluded from a use target of the electronic ticket, and the extraction unit extracts the use amount information by summing the statement amounts of items other than the item of the statement for which an instruction indicating exclusion from the use target of the electronic ticket is received from the user.

(5) The electronic ticket information processing apparatus according to the above (1) or (2), wherein the storage unit further stores target store identification information indicating the target store, and the extraction unit extracts the use amount information from the amount information included in the transaction information when the store identification information included in the transaction information acquired by the acquisition unit is included in the target store identification information, and does not extract the use amount information from the amount information included in the transaction information when the store identification information included in the transaction information acquired by the acquisition unit is not included in the target store identification information.

(6) The electronic ticket information processing apparatus according to the above (5), further including: a store designation reception unit that receives, from the user, designation of the store where the purchase transaction is performed among the target stores indicated by the target store identification information, wherein the extraction unit extracts the use amount information from the amount information included in the transaction information when the store identification information included in the transaction information acquired by the acquisition unit is matched with the store identification information of the store designated by the store designation reception unit, and does not extract the use amount information from the amount information included in the transaction information when the store identification information included in the transaction information acquired by the acquisition unit is not matched with the store identification information of the store designated by the store designation reception unit.

(7) The electronic ticket information processing apparatus according to the above (6), wherein the storage unit stores receipt format information regarding a format of a receipt of the target store in association with the target store identification information of the target store, and the acquisition unit acquires the date and time information, the store identification information, the transaction statement information, and the amount information from an image obtained by photographing the receipt issued when the purchase transaction is performed by using the receipt format information of the target store of which the designation is received as the store where the purchase transaction is performed from the user by the store designation reception unit.

(8) An electronic ticket information processing system including: the electronic ticket information processing apparatus according to the above (1) or (2); and an administrator terminal used by an administrator who manages use of the electronic ticket, wherein the extraction unit transmits information acquired by the acquisition unit to the administrator terminal used by the administrator who manages use of the electronic ticket by the user, the administrator terminal includes a correction reception unit that displays the information transmitted by the extraction unit, receives a correction instruction from the administrator, and corrects the information based on the received correction instruction, and a transmission unit that transmits the information corrected by the correction reception unit to the electronic ticket information processing apparatus, and the extraction unit extracts the use amount information based on the corrected information transmitted from the administrator terminal.

(9) An electronic ticket information processing system including: the electronic ticket information processing apparatus according to the above (1) or (2); and a user terminal used by the user, wherein the acquisition unit acquires the date and time information, the store identification information, the transaction statement information, and the amount information from an image photographed by a camera provided in the user terminal.

(10) An electronic ticket information processing program for causing an information processing apparatus to function as the electronic ticket information processing apparatus according to the above (1) or (2).

(11) An electronic ticket information processing method including: a storage step of storing user identification information for identifying a user, and an available amount and an available period of an electronic ticket to be provided to the user in association with the user identification information; an acquisition step of acquiring, from an image obtained by photographing a receipt issued when the user who uses the electronic ticket performs a purchase transaction for receiving provision of a product or a service at a target store, transaction information including date and time information regarding a date and time when the purchase transaction is performed, store identification information for identifying a store where the purchase transaction is performed, transaction statement information indicating a statement of a purchase content in the purchase transaction, and amount information regarding an amount of the purchase transaction; an extraction step of extracting, based on the transaction information acquired in the acquisition step, use amount information indicating an amount to be a use target of the electronic ticket among amounts indicated in the amount information; a calculation step of calculating an accumulated use amount of the electronic ticket by the user in the available period by accumulating amounts indicated by the use amount information for the transaction information in which a date and time indicated by the date and time information is included in the available period among respective pieces of transaction information sequentially acquired in the acquisition step; and an output step of outputting an amount according to the accumulated use amount calculated in the calculation step as an amount to be paid to the user.

Advantageous Effects of Invention

An electronic ticket information processing apparatus according to the present invention includes: a storage unit that stores user identification information for identifying a user, and an available amount and an available period of an electronic ticket to be provided to the user in association with the user identification information; an acquisition unit that acquires, from an image obtained by photographing a receipt issued when the user who uses the electronic ticket performs a purchase transaction for receiving provision of a product or a service at a target store, date and time information regarding a date and time when the purchase transaction is performed, store identification information for identifying a store where the purchase transaction is performed, transaction statement information indicating a statement of a purchase content in the purchase transaction, and amount information regarding an amount of the purchase transaction; an extraction unit that extracts, based on the information acquired by the acquisition unit, use amount information indicating an amount to be a use target of the electronic ticket among amounts indicated in the amount information; a calculation unit that calculates an accumulated use amount of the electronic ticket by the user in the available period by accumulating amounts indicated by the use amount information for the purchase transaction of the user in which a date and time indicated by the date and time information is included in the available period; and an output unit that outputs an amount according to the accumulated use amount calculated by the calculation unit as an amount to be paid to the user. The amount to be paid to the user output by the output unit can be paid to the user by a provider of the electronic ticket or the like. As a result, it is possible to provide the user with an electronic ticket available in a restaurant without imposing a burden on the restaurant side.

BRIEF DESCRIPTION OF DRAWINGS

FIG. 8 is a diagram illustrating an example of a screen displayed on the user terminal in processing of step S101 of FIG. 6.

Figure 15:
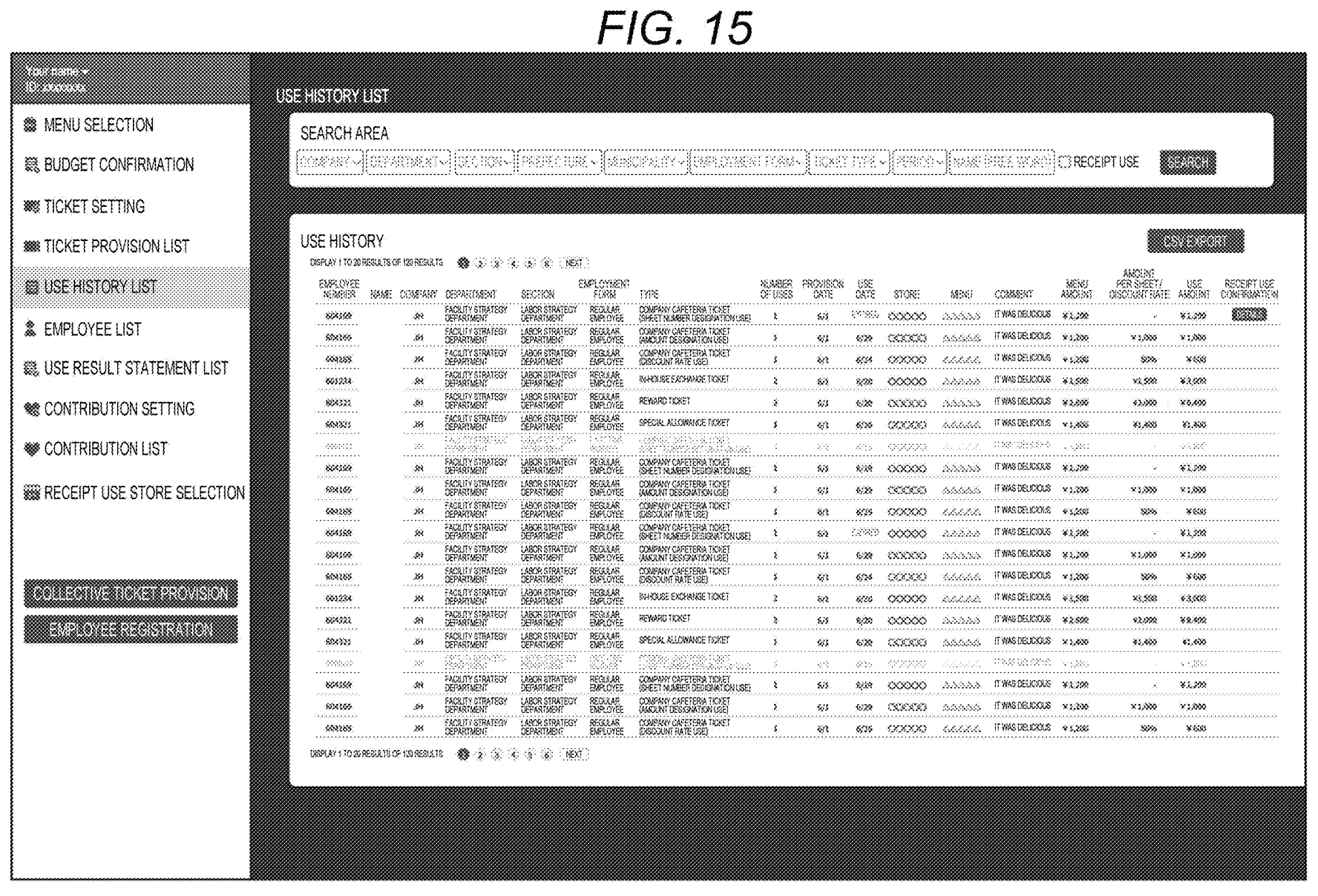

FIG. 15 is a diagram illustrating an example of a screen displayed on the administrator terminal when various types of information acquired from an image of a receipt and transmitted to the information processing apparatus are displayed and an instruction regarding correction of the various types of information is received from an administrator in processing of step S301 of FIG. 6.

DESCRIPTION OF EMBODIMENTS

Figure 1:
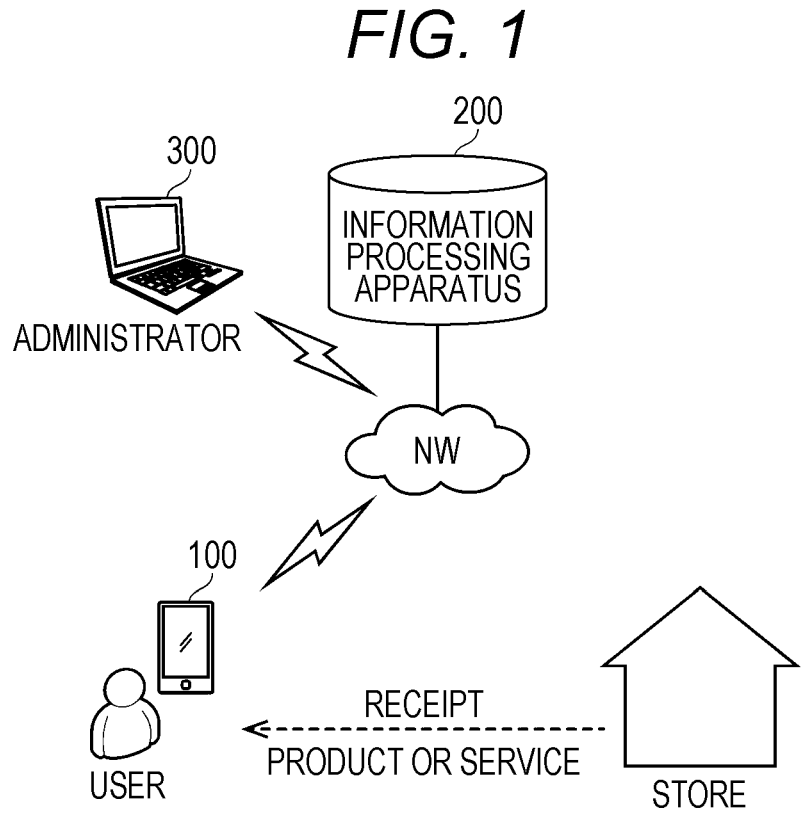
FIG. 1 is a diagram illustrating a schematic configuration of an electronic ticket information processing system according to an embodiment of the present invention.

Hereinafter, embodiments of the present invention will be described with reference to the accompanying drawings. In the description of the drawings, the same elements are denoted by the same reference numerals, and redundant description is omitted. In addition, dimensional ratios in the drawings are exaggerated for convenience of description, and may be different from actual ratios.

EMBODIMENT

<Configuration of Electronic Ticket Information Processing System>

FIG. 1 is a diagram illustrating a schematic configuration of an electronic ticket information processing system according to an embodiment of the present invention.

As illustrated in FIG. 1, the electronic ticket information processing system includes a user terminal 100, an information processing apparatus 200, and an administrator terminal 300, and individual components are configured to be able to communicate with each other through a network.

The user terminal 100 is an information terminal such as a smartphone, a tablet PC, a notebook PC, a desktop PC, or various wearable terminals, which is used by a user such as an employee who is provided with an electronic ticket from a company or the like and uses the provided electronic ticket.

The information processing apparatus 200 is a server that is provided by a company (hereinafter, also referred to as a "service provider") that manages and operates an electronic ticket information processing system and a service, and registers, manages, and transmits and receives various types of information.

The administrator terminal 300 is an information terminal such as a smartphone, a tablet PC, a notebook PC, a desktop PC, and various wearable terminals used by an administrator of a company or the like who provides an electronic ticket to an employee or the like and manages use of the electronic ticket.

The following is a detailed description of each configuration.

<User Terminal 100>

Figure 2:
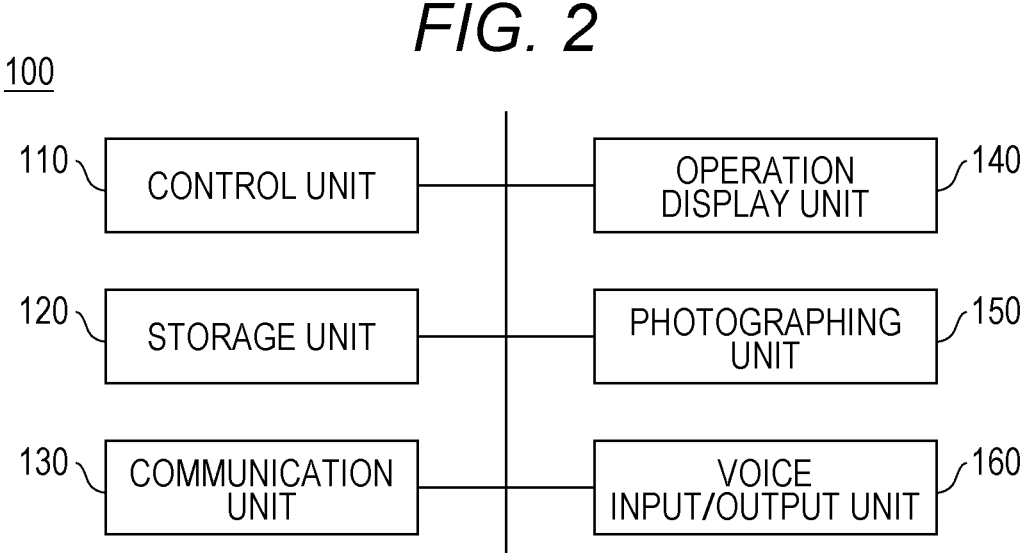
FIG. 2 is a block diagram illustrating a schematic configuration of a user terminal illustrated in FIG. 1.

FIG. 2 is a block diagram illustrating a schematic configuration of a user terminal.

As illustrated in FIG. 2, the user terminal 100 includes a control unit 110, a storage unit 120, a communication unit 130, an operation display unit 140, a photographing unit 150, and a voice input/output unit 160. The components are communicably connected to each other via a bus.

The control unit 110 includes a CPU (Central Processing Unit), and executes control of each component described above and various types of arithmetic processing according to a program.

The storage unit 120 includes a ROM (Read Only Memory) that stores various programs and various data in advance, a RAM (Random Access Memory) that temporarily stores programs and data as a work area, a hard disk that stores various programs and various data, and the like.

The communication unit 130 is a configuration for communicating with other terminals, devices, and the like via a network. The communication unit 130 transmits and receives various types of information to and from the information processing apparatus 200, for example.

The operation display unit 140 is a configuration for displaying various types of information and receiving an input from a user, and includes, for example, a touch panel type display. The operation display unit 140 may include a combination of a liquid crystal display, a pointing device such as a mouse, a keyboard, and the like.

The photographing unit 150 is a camera that uses visible light as a sensitivity region. The photographing unit 150 is used to obtain an image by photographing a desired range. In the present embodiment, the photographing unit 150 is used to photograph a receipt and acquire an image of the receipt.

The voice input/output unit 160 includes a microphone, a voice input terminal, or the like for inputting a voice, and a speaker, a voice output terminal, or the like for outputting a voice.

<Information Processing Apparatus 200>

Figure 3:
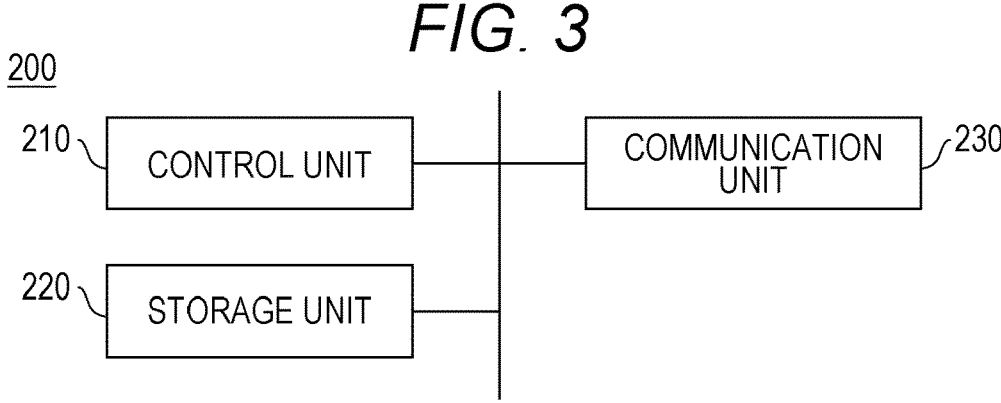
FIG. 3 is a block diagram illustrating a schematic configuration of an information processing apparatus illustrated in FIG. 1.

FIG. 3 is a block diagram illustrating a schematic configuration of the information processing apparatus illustrated in FIG. 1.

As illustrated in FIG. 3, the information processing apparatus 200 includes a control unit 210, a storage unit 220, and a communication unit 230. The components are communicably connected to each other via a bus. Note that since the respective configurations of the control unit 210, the storage unit 220, and the communication unit 230 have functions similar to those of the control unit 110, the storage unit 120, and the communication unit 130 of the user terminal 100, redundant description will be omitted. In the present embodiment, the information processing apparatus 200 functions as an electronic ticket information processing apparatus.

The storage unit 220 stores various programs and information for causing the information processing apparatus 200 to function as an electronic ticket information processing apparatus. Details of the function of the information processing apparatus 200 will be described later.

The storage unit 220 stores user identification information for identifying a user. In addition, the storage unit 220 stores an available amount of each electronic ticket provided to the user and an available period of each electronic ticket in association with the user identification information. In addition, the storage unit 220 stores target store identification information indicating a target store where the electronic ticket can be used. In addition, the storage unit 220 stores receipt format information regarding a format of a receipt issued in the target store. The receipt format information includes, for example, various types of information useful for reading the receipt, such as positions and sizes of characters and graphics described in the receipt, and contents, orders, and patterns of described items.

<Administrator Terminal 300>

Figure 4:
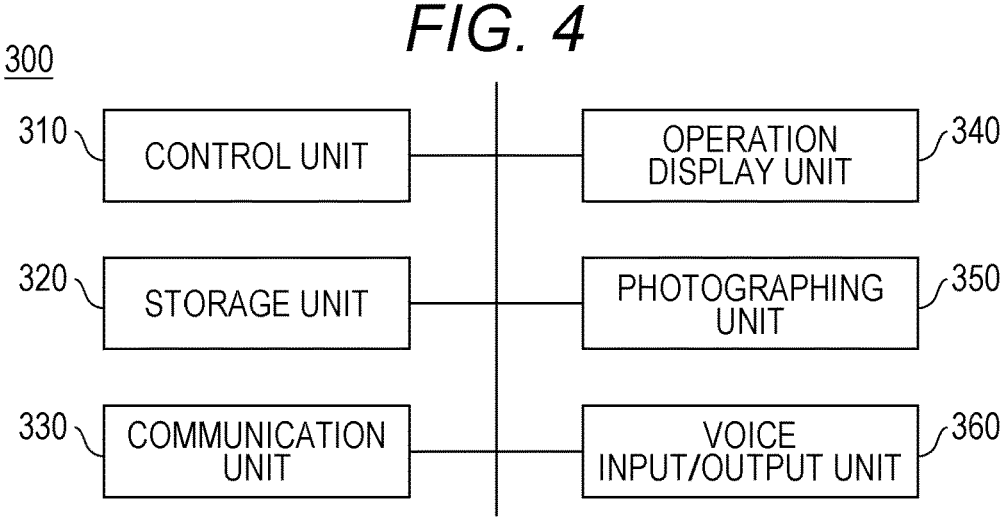
FIG. 4 is a block diagram illustrating a schematic configuration of an administrator terminal illustrated in FIG. 1.

FIG. 4 is a block diagram illustrating a schematic configuration of the Administrator terminal illustrated in FIG. 1.

As illustrated in FIG. 4, the administrator terminal 300 includes a control unit 310, a storage unit 320, a communication unit 330, an operation display unit 340, a photographing unit 350, and a voice input/output unit 360. The components are communicably connected to each other via a bus. Note that since the respective configurations of the control unit 310, the storage unit 320, the communication unit 330, the operation display unit 340, the photographing unit 350, and the voice input/output unit 360 have functions similar to those of the control unit 110, the storage unit 120, the communication unit 130, the operation display unit 140, the photographing unit 150, and the voice input/output unit 160 of the user terminal 100, redundant description will be omitted.

<Function of Information Processing Apparatus 200>

Figure 5:
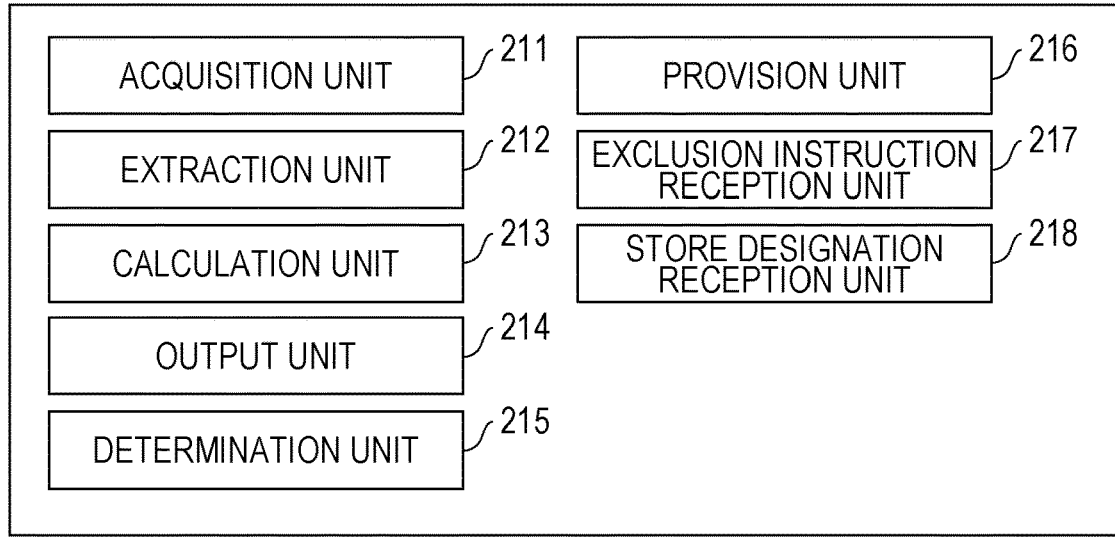
FIG. 5 is a block diagram illustrating a functional configuration of the information processing apparatus.

FIG. 5 is a block diagram illustrating a functional configuration of the information processing apparatus.

As illustrated in FIG. 5, the control unit 210 of the information processing apparatus 200 reads a program and executes processing, thereby functioning as an acquisition unit 211, an extraction unit 212, a calculation unit 213, an output unit 214, a determination unit 215, a provision unit 216, an exclusion instruction reception unit 217, and a store designation reception unit 218.

The acquisition unit 211 acquires various types of information indicating a purchase transaction content from an image obtained by photographing a receipt issued when a user who uses an electronic ticket performs a purchase transaction for receiving provision of a product or a service at a target store. The acquired information includes, for example, date and time information regarding a date and time when the purchase transaction is performed, store identification information for identifying a store where the purchase transaction is performed, transaction statement information indicating a statement of a purchase content in the purchase transaction, amount information regarding an amount of the purchase transaction, and the like.

Based on the information acquired by the acquisition unit 211, the extraction unit 212 extracts use amount information indicating an amount to be a use target of the electronic ticket among amounts indicated in the amount information.

The calculation unit 213 calculates an accumulated use amount of the electronic ticket by the user in the available period by accumulating amounts indicated by the use amount information for the purchase transaction of the user in which a date and time indicated by the date and time information is included in the available period.

The output unit 214 outputs an amount according to the accumulated use amount calculated by the calculation unit 213 as an amount to be paid to the user.

The determination unit 215 determines whether or not the accumulated use amount of the electronic ticket in the available period calculated by the calculation unit 213 exceeds the available amount of the electronic ticket in the available period. When it is determined by the determination unit 215 that the accumulated use amount exceeds the available amount, the output unit 214 outputs the available amount as the amount to be paid to the user instead of the accumulated use amount.

The provision unit 216 sets an available amount and an available period for each predetermined period, and provides the electronic ticket to the user.

The acquisition unit 211 acquires, as the amount information, information regarding a statement amount corresponding to each item of the statement indicated by the transaction statement information. The exclusion instruction reception unit 217 receives, from the user, an instruction as to whether or not each item of the statement indicated by the transaction statement information is excluded from the use target of the electronic ticket. The extraction unit 212 extracts the use amount information by summing the statement amounts of items other than the item of the statement for which an instruction indicating exclusion from the use target of the electronic ticket is received from the user.

The storage unit 220 further stores target store identification information indicating target stores where the electronic ticket can be used. The store designation reception unit 218 receives, from the user, designation of a store where the purchase transaction is performed among the target stores indicated by the target store identification information. The acquisition unit 211 acquires date and time information, store identification information, transaction statement information, and amount information for the purchase transaction for which the store designation is received from the user by the store designation reception unit 218.

The receipt format information regarding the format of the receipt of the target store is stored in the storage unit 220 in association with the target store identification information of the target store. The acquisition unit 211 acquires date and time information, store identification information, transaction statement information, amount information, and the like from an image obtained by photographing a receipt issued when the purchase transaction is performed by using the receipt format information of the target store of which the designation is received as the store where the purchase transaction is performed from the user by the store designation reception unit 218.

Note that each configuration of the electronic ticket information processing system may include components other than the above components, or may not include some of the above components.

<Outline of Processing in Electronic Ticket Information Processing System>

Figure 6:
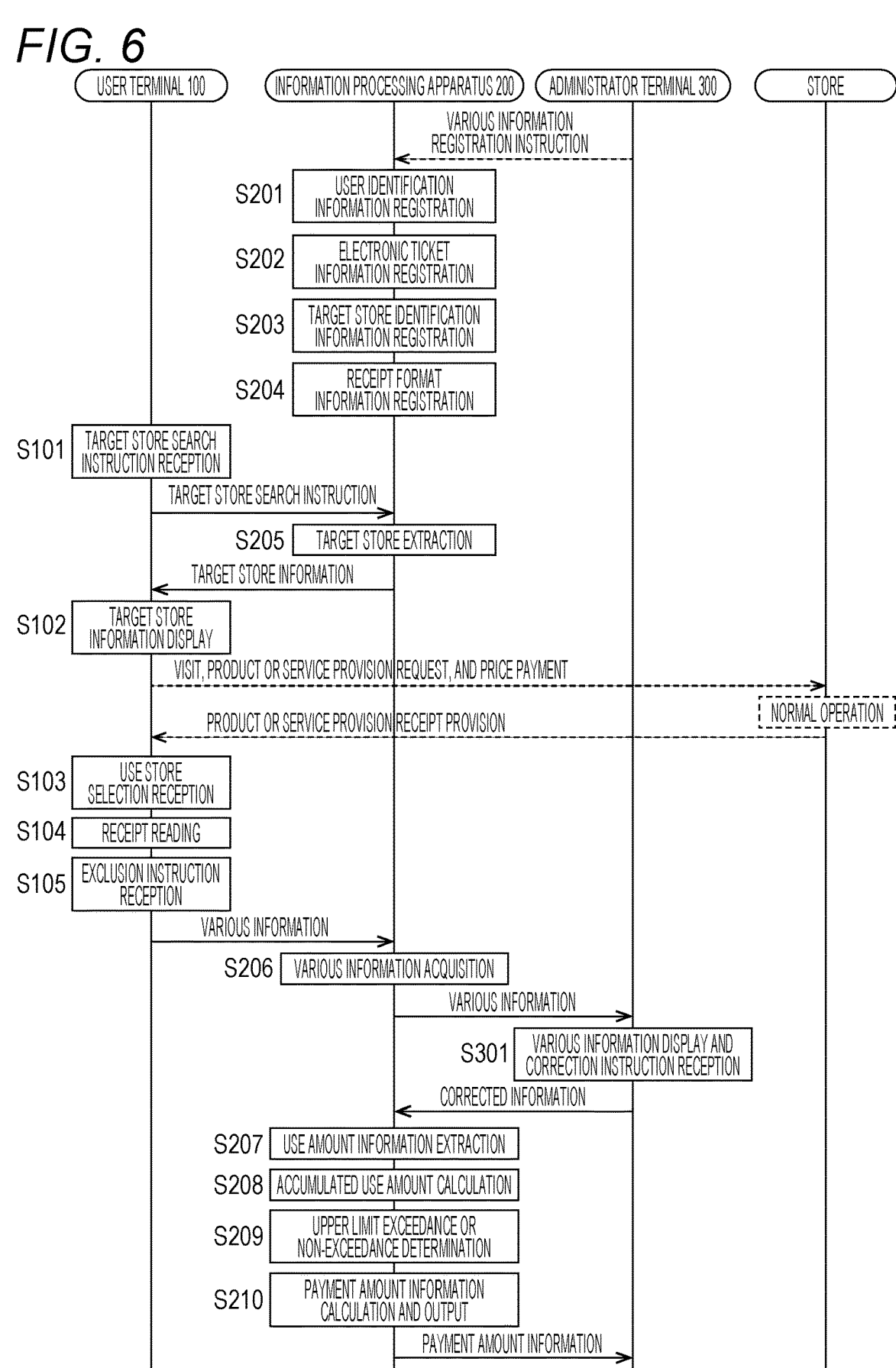
FIG. 6 is a sequence chart illustrating a procedure of processing executed in the electronic ticket information processing system illustrated in FIG. 1.
Figure 7:
FIG. 7 is a diagram illustrating an example of a screen displayed on the administrator terminal in processing of step S203 of FIG. 6.
Figure 9:
FIG. 9 is a diagram illustrating an example of a screen displayed on the user terminal when an image of a receipt is acquired in processing of step S104 of FIG. 6.
Figure 10:
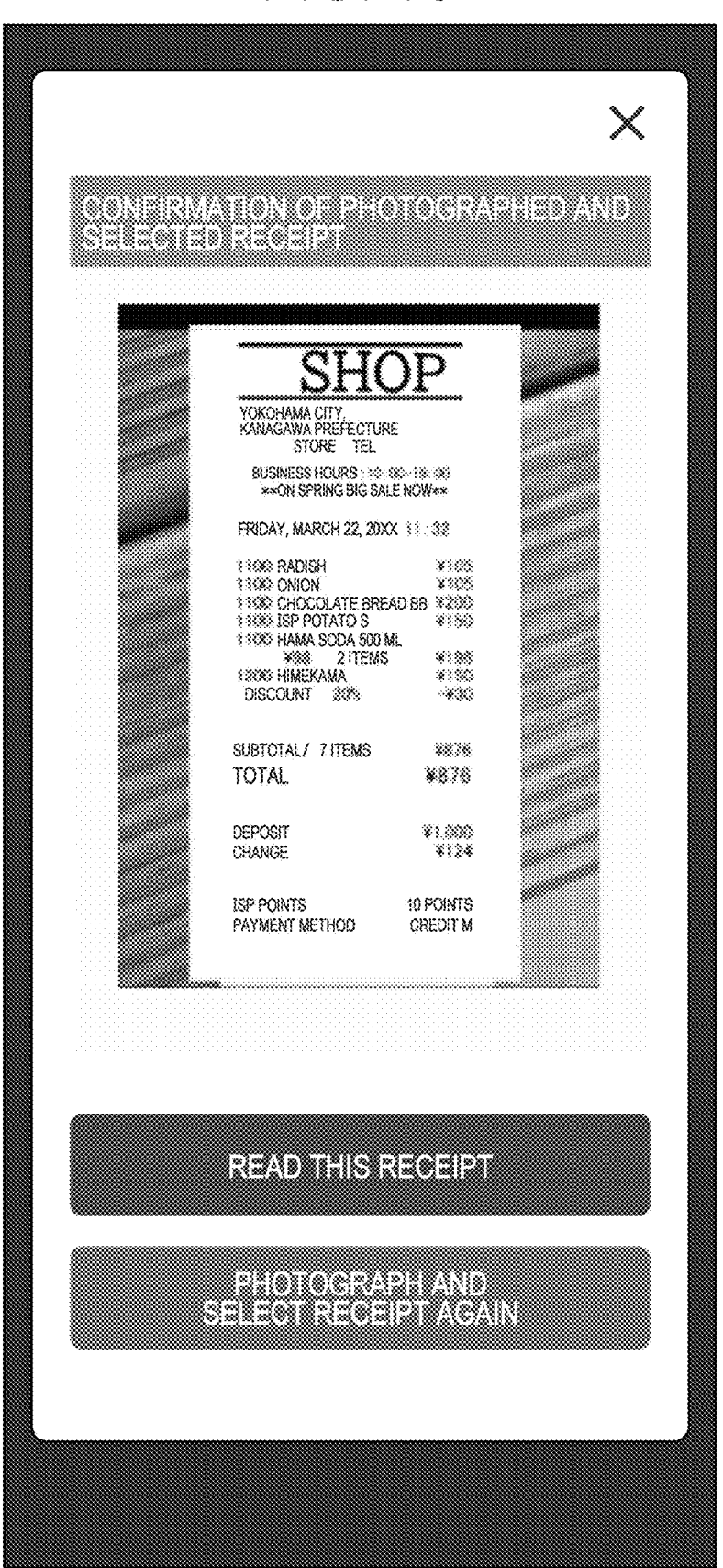
FIG. 10 is a diagram illustrating an example of a screen displayed on the user terminal when information is read from an image of a receipt in the processing of step S104 of FIG. 6.
Figure 11:
FIG. 11 is a diagram illustrating an example of a screen displayed on the user terminal when a store is determined to be an unavailable store based on information read from an image of a receipt in the processing of step S104 of FIG. 6.
Figure 12:
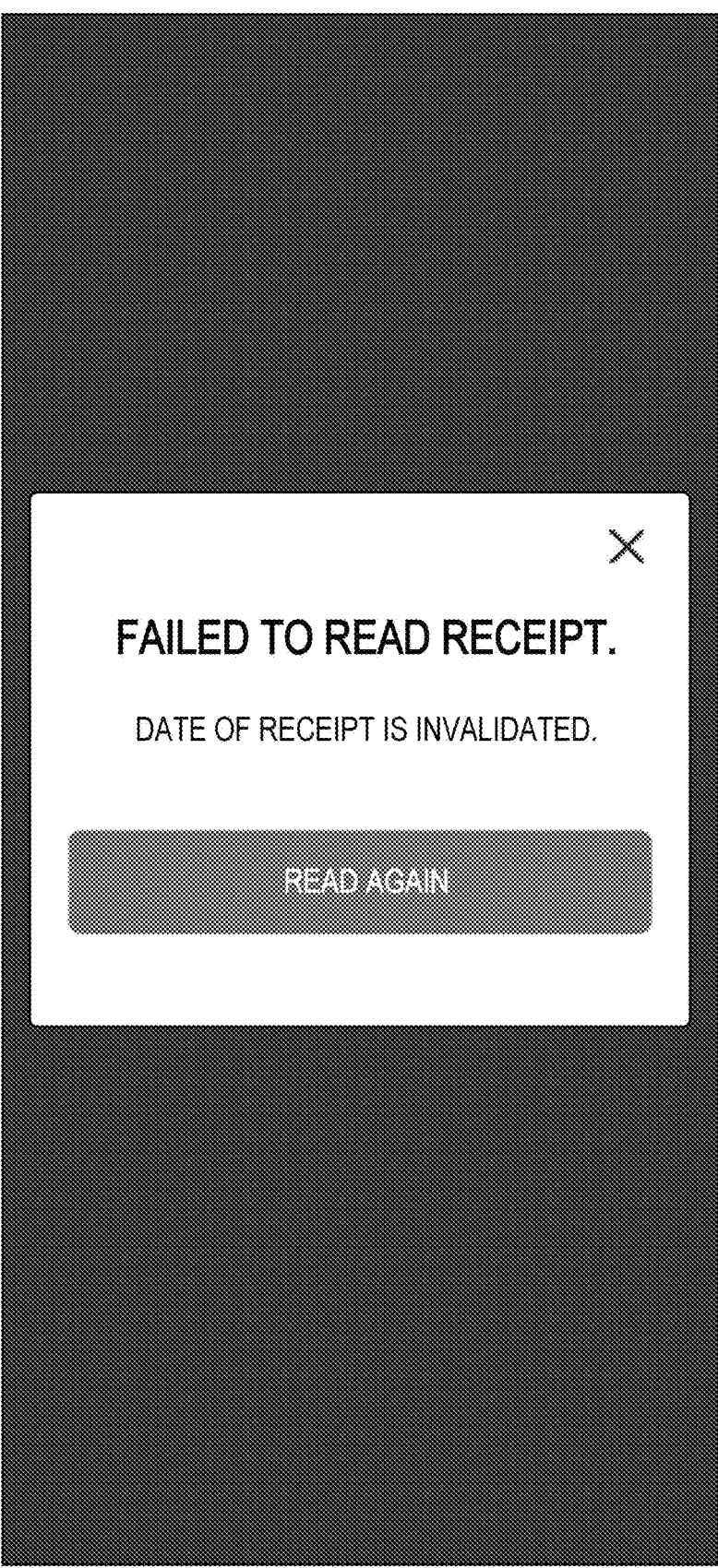
FIG. 12 is a diagram illustrating an example of a screen displayed on the user terminal when it is determined that a date is not appropriate based on information read from an image of a receipt in the processing of step S104 of FIG. 6.
Figure 13:
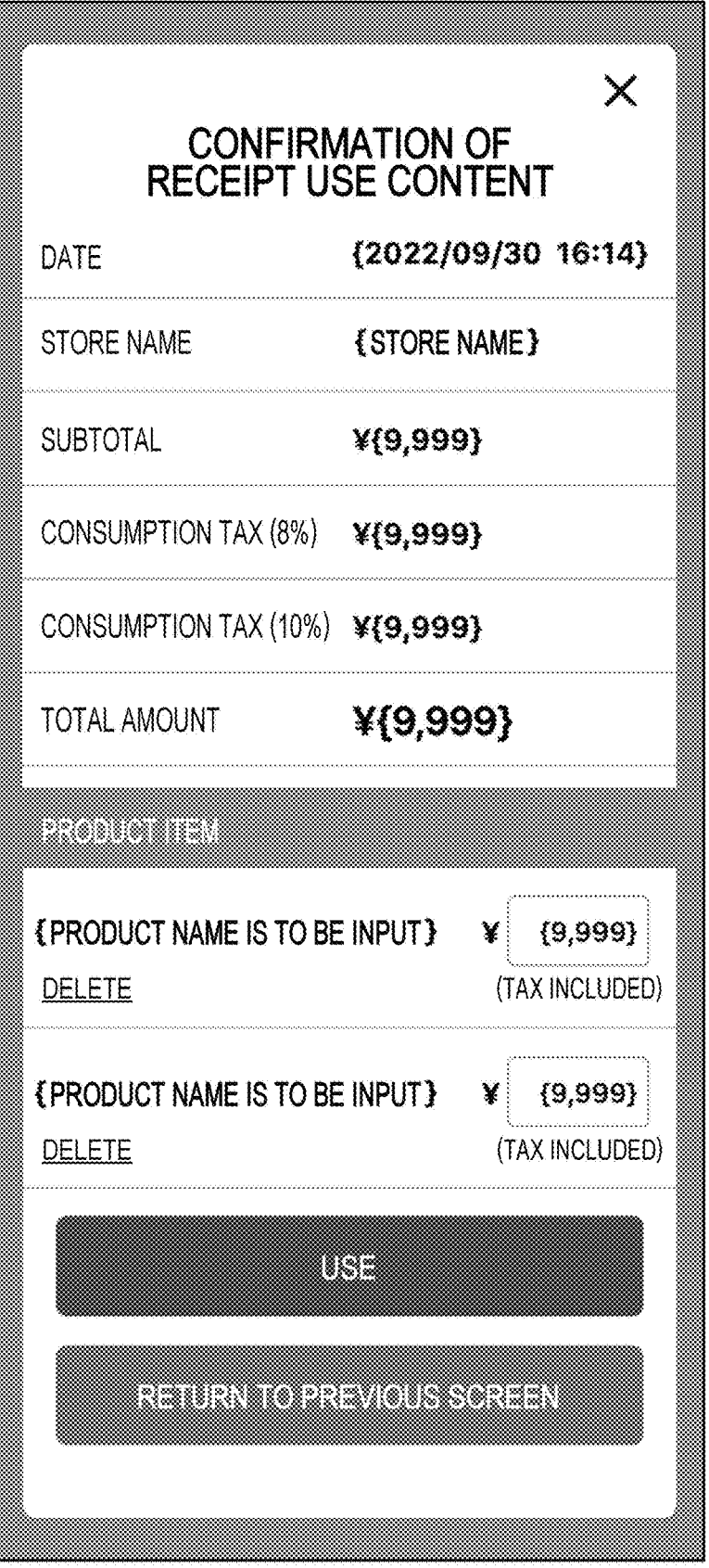
FIG. 13 is a diagram illustrating an example of a screen displayed on the user terminal when information read from an image of a receipt is displayed and an instruction regarding exclusion (deletion) of each item of a statement indicated by transaction statement information and confirmation of a use target is received from a user in processing of step S103 of FIG. 6.
Figure 14:
FIG. 14 is a diagram illustrating an example of a screen displayed on the user terminal when information is normally read from an image of a receipt and an instruction for confirming use of the receipt is received from the user in the processing of step S104 of FIG. 6.
Figure 16:
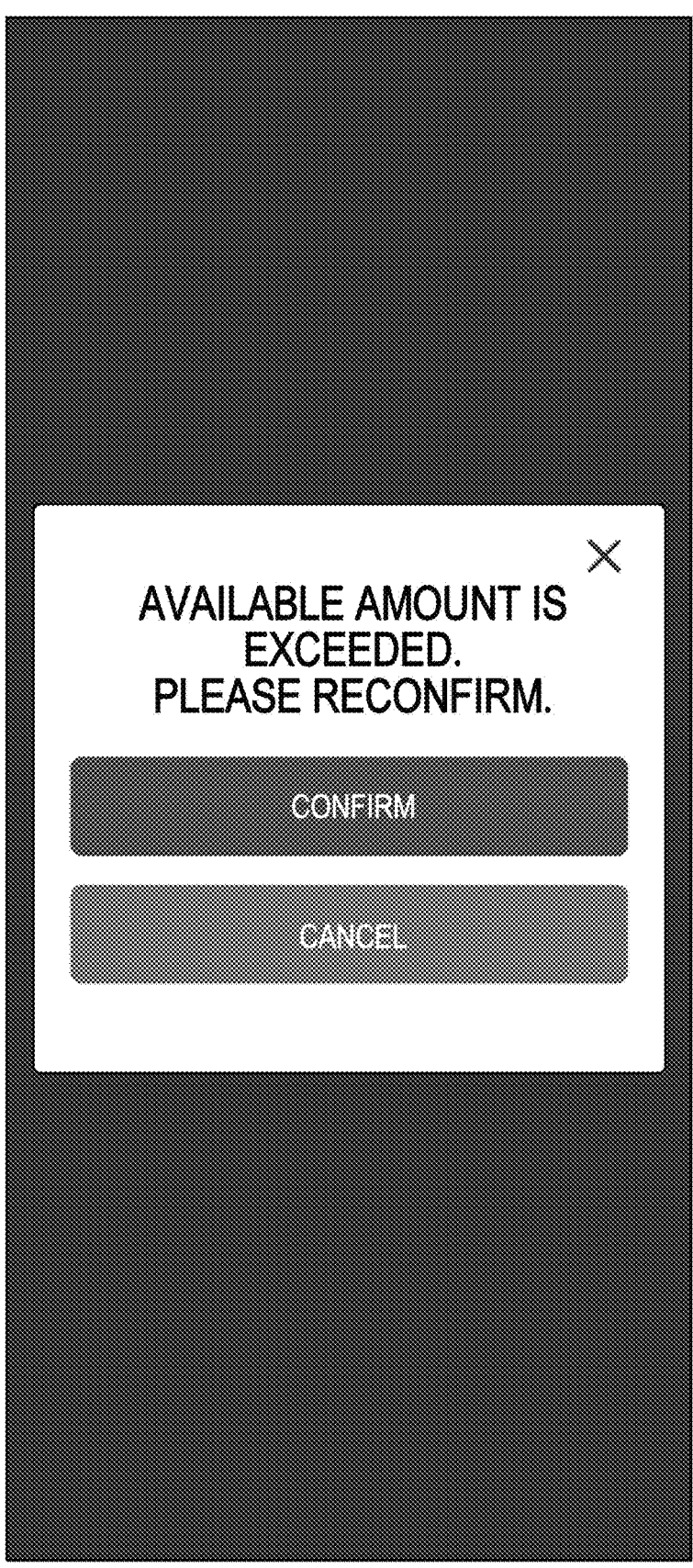
FIG. 16 is a diagram illustrating an example of a screen displayed on the user terminal when it is determined that an available amount of a ticket is exceeded in processing of step S209 of FIG. 6.

FIG. 6 is a sequence chart illustrating a procedure of processing executed in the electronic ticket information processing system illustrated in FIG. 1. The processing illustrated in the sequence chart of FIG. 6 is stored as a program in a storage of each configuration, and is executed by the control unit of each configuration controlling each unit. FIG. 7 is a diagram illustrating an example of a screen displayed on the administrator terminal in processing of step S203 of FIG. 6. FIG. 8 is a diagram illustrating an example of a screen displayed on the user terminal in processing of step S101 of FIG. 6. FIG. 9 is a diagram illustrating an example of a screen displayed on the user terminal when an image of a receipt is acquired in processing of step S104 of FIG. 6. FIG. 10 is a diagram illustrating an example of a screen displayed on the user terminal when information is read from the image of the receipt in the processing of step S104 of FIG. 6. FIG. 11 is a diagram illustrating an example of a screen displayed on the user terminal when a store is determined to be an unavailable store based on the information read from the image of the receipt in the processing of step S104 of FIG. 6. FIG. 12 is a diagram illustrating an example of a screen displayed on the user terminal when it is determined that a date is not appropriate based on the information read from the image of the receipt in the processing of step S104 of FIG. 6. FIG. 13 is a diagram illustrating an example of a screen displayed on the user terminal when information read from the image of the receipt is displayed and an instruction regarding exclusion (deletion) of each item of a statement indicated by transaction statement information and confirmation of a use target is received from a user in processing of step S103 of FIG. 6. FIG. 14 is a diagram illustrating an example of a screen displayed on the user terminal when information is normally read from the image of the receipt and an instruction for confirming use of the receipt is received from the user in the processing of step S104 of FIG. 6. FIG. 15 is a diagram illustrating an example of a screen displayed on an administrator terminal when various types of information acquired from the image of the receipt and transmitted to the information processing apparatus are displayed and an instruction regarding correction of the various types of information is received from an administrator in processing of step S301 of FIG. 6. FIG. 16 is a diagram illustrating an example of a screen displayed on the user terminal when it is determined that an available amount of a ticket is exceeded in processing of step S209 of FIG. 6.

As illustrated in FIG. 6, the administrator terminal 300 transmits a various information registration instruction to the information processing apparatus 200 based on an instruction from the administrator. For example, the information processing apparatus 200 registers user identification information for identifying a user who is a user of the electronic ticket in a database or the like of the storage unit 220 (step S201). The user identification information is unique information for identifying the user in the electronic ticket information processing system. The user identification information includes, for example, a combination of numbers, symbols, and the like, and is provided to the user in various forms such as a two-dimensional barcode, a URL, and text information. Various pieces of information such as a name, a contact address, and an employment place of the user, an administrator, a contact address of the administrator, and various attributes of the user are stored in association with the user identification information. The user identification information is also stored in the storage unit 120 or the like of the user terminal 100, and is notified from the user terminal 100 to the information processing apparatus 200 when the information processing apparatus 200 is accessed from the user terminal 100. As a result, when receiving the access from the user terminal 100, the information processing apparatus 200 can identify by which user the access is made by confirming the notified user identification information.

In addition, the information processing apparatus 200 registers electronic ticket information regarding an electronic ticket provided to each user in association with user identification information of each user (step S202). The electronic ticket information includes information such as an available amount and an available period of the electronic ticket provided to each user. For example, the information processing apparatus 200 sets an available amount and an available period for each predetermined period based on an instruction from the administrator, and then provides an electronic ticket to the user. For example, the information processing apparatus 200 may automatically provide, to each user, an electronic ticket of a predetermined available amount such as 10,000 yen available for one month from the day on which the electronic ticket is provided, once a month.

In addition, the information processing apparatus 200 registers target store identification information indicating a target store where the electronic ticket can be used (step S203). The target store identification information is unique information for identifying a store where the electronic ticket can be used in the electronic ticket information processing system. The target store identification information includes a name of the store, a code (combination of numbers and characters) assigned to the store, and the like. For example, the information processing apparatus 200 transmits information for displaying a screen illustrated in FIG. 7 to the administrator terminal 300 based on a request from the administrator terminal 300. The administrator terminal 300 causes the operation display unit 340 to display the screen illustrated in FIG. 7, and registers the target store identification information from the administrator. In the example of FIG. 7, an aspect in which an A store, a B chain, a C restaurant, a D group, and the like are already registered as candidates of the target store where the electronic ticket can be used, and the A store is registered as the target store where the electronic ticket can be used according to an instruction from the administrator is exemplified.

In addition, the information processing apparatus 200 registers receipt format information regarding the format of the receipt of the target store in association with the target store identification information of the target store (step S204).

The user terminal 100 receives an instruction to search for a target store from a user who intends to use the electronic ticket in the target store (step S101). For example, the user terminal 100 causes the operation display unit 140 to display a screen illustrated in FIG. 8, and receives a target store search condition and a search execution instruction from the user. The user terminal 100 transmits, to the information processing apparatus 200, the target store search condition and the search execution instruction received from the user.

The information processing apparatus 200 searches for a target store based on the target store search condition or the like transmitted from the user terminal 100, and extracts the target store (step S205). The information processing apparatus 200 transmits information of the target store extracted as a search result to the user terminal.

The user terminal 100 causes the operation display unit 140 to display the information of the target store transmitted from the information processing apparatus 200 (step S102). The user selects a store which the user desires to use from displayed target stores, visits the store, receives provision of a product or service, and pays a price. The store executes an operation for providing a normal product or service, receives the price from the user, and issues a receipt to the user.

The user terminal 100 receives an instruction to select the store as a use store from the user (step S103). The processing of selecting the use store in step S103 may be executed before the user visits the store after the processing in step S102.

The user terminal 100 photographs an image of a receipt based on the instruction from the user, and executes processing for reading various types of information from the receipt (step S104).

For example, the user terminal 100 activates the camera of the photographing unit 150, and causes the operation display unit 140 to display a screen for photographing the image of the receipt as illustrated in FIG. 9. As illustrated in FIG. 10, the user terminal 100 causes the operation display unit 140 to display the photographed image of the receipt, and receives an instruction regarding using the receipt and reading the information from the receipt from the user.

The user terminal 100 reads various types of information such as date and time information of a purchase transaction described in a receipt, store identification information, transaction statement information, and amount information from an image obtained by photographing the receipt using, for example, a known image analysis technology or a known character recognition technology. The processing of reading various types of information from the image of the receipt may be executed in the user terminal 100, or may be executed by another apparatus such as the information processing apparatus 200 or another server connected via a network. When the information is read from the image of the receipt, the receipt format information regarding the format of the receipt of the target store registered in advance in the information processing apparatus 200 may be referred to. As a result, since the layout, the description content, the order, the pattern, and the like of the receipt can be grasped in advance with high accuracy, the accuracy of reading the information from the receipt can be greatly improved.

For example, in a case where the store described in the receipt is not the target store as a result of reading the information from the receipt, the user terminal 100 displays an error screen illustrated in FIG. 11. For example, the user terminal 100 transmits the store identification information read from the receipt to the information processing apparatus 200. The information processing apparatus 200 determines whether or not the store identification information transmitted from the user terminal 100 is included in the target store identification information registered in advance in the storage unit 220, and in a case where the store identification information is not included, the information processing apparatus 200 notifies the user terminal 100 of the fact. The user terminal 100 that has received the notification displays the error screen illustrated in FIG. 11. Alternatively, the user terminal 100 may compare the store identification information read from the receipt with the store identification information of the use store selected (designated) by the user in the processing of step S103, and display a screen indicating that the store is not the target store in a case where the store identification information is not matched. In this case, the user terminal 100 may prompt the user to reselect the use store by executing the processing of step S103 again, or may prompt the user to read the receipt again by executing the processing of step S104 again.

Further, as a result of reading the information from the receipt, in a case where the date described in the receipt is not in a target period in which the electronic ticket can be used, the user terminal 100 displays an error screen illustrated in FIG. 12.

As illustrated in FIG. 13, the user terminal 100 causes the operation display unit 140 to display information read from the image of the receipt, and receives an instruction regarding exclusion (deletion) of each item of the statement indicated by the transaction statement information and confirmation of the use target from the user (step S105). The example of FIG. 13 illustrates that information such as "date" as date and time information, "store name" as store identification information, and "subtotal", "consumption tax" (8% or 10%), and "total amount" of the amount of the purchase transaction as amount information is read from the receipt. Further, the example of FIG. 13 illustrates that information such as "product name" and "amount" of each item as transaction statement information is read from the receipt, in a field of "product item". On a screen of FIG. 13, a menu of "delete" is displayed in association with each item of the transaction statement information. When the menu of "delete" of each item is selected by the user, the user terminal 100 receives, from the user, an instruction to exclude the item from the use target of the electronic ticket. On the other hand, when a button of "use" is selected for the item of the transaction statement information for which the menu of "delete" is not selected on the screen of FIG. 13, the user terminal 100 receives, from the user, an instruction to set the item as the use target without excluding the item from the use target of the electronic ticket. Note that the above instruction received from the user in the user terminal 100 is also transmitted to the information processing apparatus 200, and a similar instruction is also received in the information processing apparatus 200.

When the button of "use" is selected on the screen of FIG. 13, the user terminal 100 displays a screen illustrated in FIG. 14 and receives an instruction to confirm use of the receipt from the user. The user terminal 100 transmits various types of information such as the information acquired from the receipt, the instruction received from the user, and the read information indicating the image of the receipt to the information processing apparatus 200.

The information processing apparatus 200 receives and acquires various types of information transmitted from the user terminal 100 (step S206). In addition, the information processing apparatus 200 transmits various types of information transmitted from the user terminal 100 to the administrator terminal 300.

The administrator terminal 300 causes the operation display unit 340 to display various types of information transmitted from the information processing apparatus 200 by a screen illustrated in FIG. 15 as a correction reception unit, and receives instructions such as confirmation and correction from the administrator (step S301). On the screen illustrated in FIG. 15, a list of use results of electronic tickets is displayed. In addition, information such as "employee number", "name", "company", "department", "section", and "employment form" of the user is displayed as information regarding the user who has used the ticket. In addition, on the screen of FIG. 15, information such as "type", "number of uses", and "provision date" of the electronic ticket is displayed as information regarding the used electronic ticket. In addition, information such as "use date" (transaction date), "store", "menu (product item)", "menu amount (amount of each product item)", and "use amount" is displayed as information regarding the purchase transaction using the electronic ticket. In addition, by selecting a "detail" button arranged in a column of "receipt use confirmation", the administrator can display and confirm an image of the photographed receipt, information read from the image of the receipt, and various types of information such as an instruction received from the user regarding the information, and can correct various types of information as necessary. When receiving an instruction of correction of various types of information from the administrator, the administrator terminal 300 corrects various types of information based on the received instruction of the correction. The administrator terminal 300 transmits the corrected various information to the information processing apparatus 200 as a transmission unit. Note that the information display and correction instruction reception processing in the administrator terminal 300 (including transmission and reception of information to and from the information processing apparatus 200) illustrated in step S301 may be executed at timing other than the timing illustrated in FIG. 6, and may be executed at any timing based on an instruction from the administrator, for example.

Based on the information transmitted from the user terminal 100, the information regarding the correction transmitted from the administrator terminal 300, and the like, the information processing apparatus 200 extracts use amount information indicating an amount to be used for the electronic ticket in the purchase transaction (step S207). For example, in the processing in step S105, the information processing apparatus 200 extracts the use amount information by summing the statement amounts of items other than the item of the statement for which an instruction indicating exclusion from the use target of the electronic ticket is received from the user. In addition, the information processing apparatus 200 reflects the content corrected by the administrator in the processing of step S301 and then extracts the use amount information.

The information processing apparatus 200 accumulates the amount indicated by the use amount information extracted in step S207 for the transaction information in which the date and time indicated by the date and time information is included in a predetermined available period among the respective pieces of transaction information sequentially acquired from the same user terminal 100 so far (step S208). As a result, the information processing apparatus 200 can calculate an accumulated use amount of the electronic ticket by the user in the available period. For example, in a case where an electronic ticket available within the month is provided to the user, the information processing apparatus 200 accumulates the amount indicated by the use amount information for transaction information in which the date and time indicated by the date and time information is a date within the month. As a result, it is possible to calculate the accumulated use amount of the electronic ticket by the user within the month.

The information processing apparatus 200 determines whether or not the accumulated use amount of the electronic ticket by the user in the available period, calculated in the processing in step S208, exceeds the available amount of the electronic ticket in the available period (step S209). In a case where the accumulated use amount of the electronic ticket exceeds the available amount of the electronic ticket in the available period, a screen illustrated in FIG. 16 may be displayed on the user terminal 100.

The information processing apparatus 200 calculates an amount to be paid to the user according to the accumulated use amount, and transmits information indicating the calculated amount to the administrator terminal 300 as payment amount information to output it (step S210). For example, in a case where the accumulated use amount is equal to or less than the available amount, the information processing apparatus 200 may set the accumulated use amount as the amount to be paid to the user. On the other hand, in a case where the accumulated use amount exceeds the available amount, the information processing apparatus 200 may set the available amount as the amount to be paid to the user instead of the accumulated use amount. For example, in a case where an amount of 20,000 yen is provided to the user for an electronic ticket with an available period within a month, when an accumulated use amount of the electronic ticket by the user within the month is 19,000 yen, 19,000 yen that is the accumulated use amount is output as the amount to be paid to the user. On the other hand, when the accumulated use amount of the electronic ticket by the user within the month is 21,000 yen, 20,000 yen that is the available amount may be output as the amount to be paid to the user.

For example, the administrator terminal 300 displays the payment amount information transmitted from the information processing apparatus 200, and executes processing of paying an amount corresponding to the payment amount information to the user based on an instruction from the administrator. As a result, the user can receive a payment corresponding to the use amount of the electronic ticket from the administrator.

Note that, in the above example, an example has been described in which the accumulated use amount is used as it is as the amount to be paid to the user or is compared with the available amount, but the present invention is not limited thereto. For example, instead of using the accumulated use amount as it is, an amount obtained by multiplying the accumulated use amount by a predetermined ratio (70%, 50%, or the like) may be used. Alternatively, when the use amount information is extracted in the processing of step S207 or the like, an amount obtained by multiplying each piece of transaction information by a predetermined ratio may be extracted as the use amount information.

As described above, the information processing apparatus 200 according to the present embodiment stores user identification information for identifying a user, and an available amount and an available period of an electronic ticket to be provided to the user in association with the user identification information. In addition, the information processing apparatus 200 acquires, from an image obtained by photographing a receipt issued when the user who uses the electronic ticket performs a purchase transaction for receiving provision of a product or a service at a target store, transaction information including date and time information regarding a date and time when the purchase transaction is performed, store identification information for identifying the store where the purchase transaction is performed, transaction statement information indicating a statement of a purchase content in the purchase transaction, and amount information regarding an amount of the purchase transaction. In addition, based on the acquired transaction information, the information processing apparatus 200 extracts use amount information indicating an amount to be a use target of the electronic ticket among amounts indicated in the amount information. In addition, the information processing apparatus 200 accumulates amounts indicated by the use amount information for the transaction information in which the date and time indicated by the date and time information is included in the available period among respective pieces of transaction information sequentially acquired, and calculates an accumulated use amount of the electronic ticket by the user in the available period. In addition, the information processing apparatus 200 outputs an amount corresponding to the calculated accumulated use amount as an amount to be paid to the user. Therefore, the electronic ticket can be used by reading the receipt acquired from the store using the user terminal 100 by the user, acquiring various types of information, and transmitting the information to the information processing apparatus 200. For this reason, since the store only needs to perform a normal store operation, it is possible to provide the user with an electronic ticket available in the store and cause the electronic ticket to be available, without imposing a burden on the store side. As a result, since the burden on the store side can be greatly reduced, the number of stores where the electronic ticket can be used can be increased, and the convenience of the user can also be improved. Furthermore, since the user also performs normal payment processing at the store for the transaction using the electronic ticket, the store can avoid delay of the deposit timing of accounts receivable from the normal payment by using the electronic ticket. Therefore, it is possible to eliminate the influence on the cash flow of the store by introducing the payment with the electronic ticket, and it is possible to facilitate introduction of the electronic ticket by the store.

In addition, the information processing apparatus 200 determines whether or not the accumulated use amount of the electronic ticket in the available period exceeds the available amount of the electronic ticket in the available period, and outputs the available amount as the amount to be paid to the user instead of the accumulated use amount when it is determined that the accumulated use amount exceeds the available amount. As a result, the accumulated use amount can be output as the amount to be paid to the user, with the available amount of the electronic ticket provided to the user as the upper limit.

In addition, the information processing apparatus 200 sets an available amount and an available period for each predetermined period and provides the electronic ticket to the user. As a result, for example, in a company, it is possible to automatically provide the electronic ticket to an employee by setting the available amount and the available period for each predetermined period such as every month, every week, or every day, and it is possible to greatly reduce a workload of an administrator or the like of the company who provides and manages the ticket.

In addition, the information processing apparatus 200 acquires, as the amount information, information regarding a statement amount corresponding to each item of the statement indicated by the transaction statement information, and receives, from the user, an instruction as to whether or not each item of the statement indicated by the transaction statement information is excluded from the use target of the electronic ticket. Then, the information processing apparatus 200 extracts the use amount information by summing the statement amounts of items other than the item of the statement for which an instruction indicating exclusion from the use target of the electronic ticket is received from the user. Therefore, the user can specify whether or not each item indicated as a statement in one receipt is set as the use target of the electronic ticket, and use the electronic ticket for each item in the statement. Therefore, the user can collectively purchase a product or service that is the use target of the electronic ticket and a product or service that is not the use target of the electronic ticket in one purchase transaction, read one receipt, and then select whether or not to set each item of the statement as the use target. As a result, since the user does not need to separately purchase the product or service that is the use target of the electronic ticket and the product or service that is not the use target of the electronic ticket, it is possible to greatly improve convenience in both the user and the store.

In addition, the information processing apparatus 200 further stores target store identification information indicating a target store. Then, in a case where the store identification information included in the acquired transaction information is included in the target store identification information, the information processing apparatus 200 extracts the use amount information from the amount information included in the transaction information. On the other hand, in a case where the store identification information included in the acquired transaction information is not included in the target store identification information, the information processing apparatus 200 does not extract the use amount information from the amount information included in the transaction information. As a result, since the electronic ticket can be used only in a store registered in advance as a store where the electronic ticket can be used, the use of the electronic ticket can be appropriately managed.

In addition, the information processing apparatus 200 receives, from the user, designation of a store where the purchase transaction is performed among the target stores indicated by the target store identification information. Then, in a case where the store identification information included in the acquired transaction information is matched with the store identification information of the store of which the designation is received from the user, the information processing apparatus 200 extracts the use amount information from the amount information included in the transaction information. On the other hand, in a case where the store identification information included in the acquired transaction information is not matched with the store identification information of the store of which the designation is received from the user, the information processing apparatus 200 does not extract the use amount information from the amount information included in the transaction information. As a result, since the electronic ticket can be used only in the store selected by the user from the stores registered in advance as the stores where the electronic ticket can be used, the use of the electronic ticket can be managed more appropriately.

In addition, the information processing apparatus 200 stores the receipt format information regarding the format of the receipt of the target store in association with the target store identification information of the target store. Then, the information processing apparatus 200 acquires date and time information, store identification information, transaction statement information, and amount information from an image obtained by photographing a receipt issued when the purchase transaction is performed by using the receipt format information of the target store of which the designation is received as the store where the purchase transaction is performed from the user. As a result, since it is possible to read various types of information from the image obtained by photographing the receipt by using the receipt format information of the target store registered in advance, it is possible to accurately read various types of information and more appropriately use the electronic ticket.

In addition, the information processing apparatus 200 transmits the acquired information to the administrator terminal 300 used by an administrator who manages use of the electronic ticket by the user. The administrator terminal 300 displays the information transmitted from the information processing apparatus 200, receives an instruction of correction by the administrator, corrects the information based on the received instruction of correction, and transmits the corrected information to the information processing apparatus 200. Then, the information processing apparatus 200 extracts the use amount information based on the corrected information transmitted from the administrator terminal 300. As a result, the administrator can easily confirm and correct various types of information regarding the use of the electronic ticket transmitted by the user, so that the use of the electronic ticket can be managed more appropriately.

Note that the present invention is not limited to the above-described embodiments and modifications, and various modifications can be made within the scope of claims.

For example, in the above embodiment, an example in which the electronic ticket is provided from the company to the employee has been mainly described, but the present invention is not limited thereto. The electronic ticket can be provided from an arbitrary granter such as various organizations or groups or management entities to an arbitrary grantee such as a member of the organization or group or a management target person, and can be used.

Further, in the above embodiment, an example has been described in which the electronic ticket is used by photographing, by the user terminal 100, the receipt obtained from the store after the user pays for the product or service, reading transaction information, and transmitting the transaction information from the user terminal 100 to the information processing apparatus 200. However, a method for using the electronic ticket is not limited to the above method. For example, in a case where a store terminal used in the store can be prepared, the electronic ticket may be used by reading user identification information from the user terminal 100 in the store terminal and transmitting the user identification information to the information processing apparatus 200 together with various types of information such as date and time information, store identification information, and amount information. Alternatively, the electronic ticket may be used by reading a display indicating store identification information installed in the store by the user terminal 100 and transmitting the store identification information to the information processing apparatus 200 together with various types of information such as the user identification information, the date and time information, and the amount information.

In addition, each of the user terminal 100, the information processing apparatus 200, and the administrator terminal 300 may include a plurality of apparatuses, or may include a single apparatus.

In addition, the function of each configuration may be realized by another configuration. For example, each function of the information processing apparatus 200 may be realized by the user terminal 100 or the administrator terminal 300, or may be realized by another server. Alternatively, a part of each function of the user terminal 100, the administrator terminal 300, and the like may be realized by the information processing apparatus 200.

In addition, the processing unit of the sequence chart in the above embodiment is divided according to main processing contents in order to facilitate understanding of each processing. The present invention is not limited by the way of classifying processing steps. Each processing can also be divided into more processing steps. In addition, one processing step may execute more processing.

Means and methods for performing various processing in the system according to the above-described embodiment can also be realized by either a dedicated hardware circuit or a programmed computer. The program may be provided by, for example, a computer-readable recording medium such as a flexible disk or a CD-ROM, or may be provided online via a network such as the Internet. In this case, the program recorded in the computer-readable recording medium is normally transferred to and stored in a storage unit such as a hard disk. In addition, the program may be provided as independent application software, or may be incorporated in the software of the apparatus as one function of the system.

The present application is based on Japanese Patent Application No. 2022-202906 filed on Dec. 20, 2022, the disclosure of which is incorporated herein by reference in its entirety.

REFERENCE SIGNS LIST

- 100 User terminal
- 110 Control unit
- 120 Storage unit
- 130 Communication unit
- 140 Operation display unit
- 150 Photographing unit
- 160 Voice input/output unit
- 200 Information processing apparatus
- 210 Control unit
- 211 Acquisition unit
- 212 Extraction unit
- 213 Calculation unit
- 214 Output unit
- 215 Determination unit
- 216 Provision unit
- 217 Exclusion instruction reception unit

218 Store designation reception unit
220 Storage unit
230 Communication unit
300 Administrator terminal
310 Control unit
320 Storage unit
330 Communication unit
340 Operation display unit
350 Photographing unit
360 Voice input/output unit

The invention claimed is:

1. An electronic ticket information processing apparatus comprising:

a memory that stores user identification information for identifying a user, an available amount and an available period of an electronic ticket to be provided to the user in association with the user identification information, target store identification information indicating a target store, and receipt format information of a receipt of a store in association with store identification information of the store, wherein the receipt format information includes at least three of positions of characters and graphics described in the receipt, sizes of the characters and graphics described in the receipt, contents of items described in the receipt, orders of the items described in the receipt, and patterns of the items described in the receipt; and a first processor, the first processor being configured to:

acquire, from an image obtained by photographing a receipt issued when the user who uses the electronic ticket performs a purchase transaction for receiving provision of a product or a service at the target store, transaction information including date and time information regarding a date and time when the purchase transaction is performed, the store identification information for identifying the store where the purchase transaction is performed, transaction statement information indicating a statement of a purchase content in the purchase transaction, and amount information regarding an amount of the purchase transaction;

extract, based on the acquired transaction information, use amount information indicating an amount to be a use target of the electronic ticket among amounts indicated in the amount information;

calculate an accumulated use amount of the electronic ticket by the user in the available period by accumulating amounts indicated by the use amount information for the transaction information in which a date and time indicated by the date and time information is included in the available period among respective pieces of transaction information sequentially acquired; and output an amount according to the calculated accumulated use amount as an amount to be paid to the user, wherein the first processor is configured to acquire information regarding a statement amount corresponding to each item of the statement indicated by the transaction statement information as the amount information, receive, from the user, designation of the store where the purchase transaction is performed at the target store indicated by the target store identification information, extract the use amount information from the amount information included in the transaction information when the store identification information included in the acquired transaction information is matched with the store identification information of the designated store, while not to extract the use amount information from the amount information included in the transaction information when the store identification information included in the acquired transaction information is not matched with the store identification information of the designated store, receive, from the user, an instruction as to whether or not each item of the statement indicated by the transaction statement information is excluded from a use target of the electronic ticket, and extract the use amount information by summing the statement amounts of items other than the item of the statement for which an instruction indicating exclusion from the use target of the electronic ticket is received from the user, wherein the first processor analyzes the image using the stored receipt format information to identify and acquire the transaction information based on the at least three of the positions of the characters and graphics described in the receipt, sizes of the characters and graphics described in the receipt, the contents of items described in the receipt, orders of the items described in the receipt, and patterns of the items described in the receipt.

2. The electronic ticket information processing apparatus according to claim 1, wherein the first processor is further configured to:

determine whether or not the calculated accumulated use amount of the electronic ticket in the available period exceeds the available amount of the electronic ticket in the available period, and when it is determined that the calculated accumulated use amount exceeds the available amount, the first processor outputs the available amount as an amount to be paid to the user instead of the calculated accumulated use amount.

3. The electronic ticket information processing apparatus according to claim 1, wherein the first processor is further configured to provide the electronic ticket to the user by setting the available amount and the available period for each predetermined period.

4. An electronic ticket information processing system comprising:

the electronic ticket information processing apparatus according to claim 1; and an administrator terminal used by an administrator who manages use of the electronic ticket, wherein the first processor transmits the acquired transaction information to the administrator terminal used by the administrator who manages use of the electronic ticket by the user, the administrator terminal includes a second processor, the second processor being configured to:

display the transaction information transmitted by the first processor, receives a correction instruction from the administrator, and corrects the transaction information based on the received correction instruction, and transmit the corrected transaction information to the electronic ticket information processing apparatus, and the first processor extracts the use amount information based on the corrected transaction information transmitted from the administrator terminal.

5. The electronic ticket information processing system according to claim 4, wherein the second processor executes payment of an amount corresponding to the extracted use amount information based on the corrected transaction information to the user.

6. An electronic ticket information processing system comprising:

the electronic ticket information processing apparatus according to claim 1; and a user terminal used by the user, wherein the first processor acquires the date and time information, the store identification information, the transaction statement information, and the amount information from an image photographed by a camera provided in the user terminal.

7. An electronic ticket information processing method comprising:

a storage step of storing user identification information for identifying a user, an available amount and an available period of an electronic ticket to be provided to the user in association with the user identification information, target store identification information indicating a target store, and receipt format information of a receipt of a store in association with store identification information of the store, wherein the receipt format information includes at least three of positions of characters and graphics described in the receipt, sizes of the characters and graphics described in the receipt, contents of items described in the receipt, orders of the items described in the receipt, and patterns of the items described in the receipt;

an acquisition step of acquiring, from an image obtained by photographing a receipt issued when the user who uses the electronic ticket performs a purchase transaction for receiving provision of a product or a service at the target store, transaction information including date and time information regarding a date and time when the purchase transaction is performed, the store identification information for identifying the store where the purchase transaction is performed, transaction statement information indicating a statement of a purchase content in the purchase transaction, and amount information regarding an amount of the purchase transaction;

an extraction step of extracting, based on the transaction information acquired in the acquisition step, use amount information indicating an amount to be a use target of the electronic ticket among amounts indicated in the amount information;

a designating reception step of receiving, from the user, designation of the store where the purchase transaction is performed at the target store indicated by the target store identification information;

a calculation step of calculating an accumulated use amount of the electronic ticket by the user in the available period by accumulating amounts indicated by the use amount information for the transaction information in which a date and time indicated by the date and time information is included in the available period among respective pieces of transaction information sequentially acquired in the acquisition step; and an output step of outputting an amount according to the accumulated use amount calculated in the calculation step as an amount to be paid to the user, wherein the acquisition step acquires information regarding a statement amount corresponding to each item of the statement indicated by the transaction statement information as the amount information, and the extraction step extracts the use amount information from the amount information included in the transaction information when the store identification information included in the acquired transaction information is matched with the store identification information of the designated store, while does not extract the use amount information from the amount information included in the transaction information when the store identification information included in the acquired transaction information is not matched with the store identification information of the designated store, the electronic ticket information processing method further comprises an exclusion instruction reception step of receiving, from the user, an instruction as to whether or not each item of the statement indicated by the transaction statement information is excluded from a use target of the electronic ticket, and the extraction step extracts the use amount information by summing the statement amounts of items other than the item of the statement for which an instruction indicating exclusion from the use target of the electronic ticket is received from the user, wherein the acquisition step analyzes the image using the stored receipt format information to identify and acquire the transaction information based on the at least three of the positions of characters and graphics described in the receipt, sizes of the characters and graphics described in the receipt, the contents of items described in the receipt, orders of the items described in the receipt, and patterns of the items described in the receipt.

\* \* \* \* \*